United States Patent [19]

Frederick et al.

[11] Patent Number: 5,955,975
[45] Date of Patent: Sep. 21, 1999

[54] APPARATUS AND ASSOCIATED METHOD FOR RECOVERING LOST BREAK CODES FOR WIRELESS KEYBOARDS

[75] Inventors: John W. Frederick, Spring; Kevin J. Brusky, Magnolia, both of Tex.

[73] Assignee: Compaq Computer Corporation, Houston, Tex.

[21] Appl. No.: 08/940,276

[22] Filed: Sep. 30, 1997

[51] Int. Cl.$^6$ .................................................. G08B 11/00
[52] U.S. Cl. .............................. 341/22; 341/26; 359/142; 359/154
[58] Field of Search .................... 341/20, 22, 26; 710/67; 345/168, 172; 359/142, 154

[56] References Cited

U.S. PATENT DOCUMENTS

| | | | |
|---|---|---|---|
| 4,937,778 | 6/1990 | Wolf et al. | 710/67 |
| 5,189,543 | 2/1993 | Lin et al. | 359/142 |
| 5,287,526 | 2/1994 | Wolf et al. | 700/146 |
| 5,589,599 | 12/1996 | Shiga | 341/22 |
| 5,615,393 | 3/1997 | Kikinis | 341/32 |
| 5,737,107 | 4/1998 | Umeda | 359/146 |
| 5,861,822 | 1/1999 | Park | 341/22 |

*Primary Examiner*—Michael Horabik
*Assistant Examiner*—Albert K. Wong
*Attorney, Agent, or Firm*—Jenkens & Gilchrist P.C.

[57] ABSTRACT

An apparatus and method for recovering "break" codes transmitted by a keyboard that are not properly received by the receiver of the computer system. The keyboard is an infrared keyboard that transmits to a receiver in the computer system "make" codes when the keys are depressed and transmits to the receiver "break" codes when the keys are released. Upon receipt of the "make" and "break" codes, the receiver keeps track of the status of each of the keys, i.e., depressed or released, by updating a database in response to receipt of the "make" and "break" codes. At select time intervals, the keyboard transmits to the receiver an "idle" code containing data corresponding to the status of each key. Upon receipt of the "idle" code, the receiver compares the "idle" code with the status of each key as indicated by the data base. The receiver then generates a "break" code for each of the keys that do not compare.

9 Claims, 3 Drawing Sheets

APPARATUS AND ASSOCIATED METHOD FOR RECOVERING LOST BREAK CODES FOR WIRELESS KEYBOARDS

FIELD OF THE INVENTION

The present invention relates to computer keyboards, and more particularly, but not by way of limitation, to an apparatus and associated method for recovering lost "break" codes that are transmitted by an infrared wireless keyboard but are not received by the receiver of a computer system.

BACKGROUND OF THE INVENTION

Most current computers utilize keyboards that are physically connected to the computer by a cable. By pressing a key on the keyboard, the keyboard generates a "make" code which is transmitted over the cable to the computer. Releasing the key generates a corresponding "break" code which is sent over the cable. Each key on the keyboard has a corresponding "make" and "break" code, thereby identifying which key is depressed and released. When a key is depressed and the "make" code is transmitted to the computer, upon receipt of the "make" code, the computer responds to the code accordingly, such as by displaying a character on its display. Generally, if the key is not released, the keyboard will continue to generate the corresponding "make" code until the key is released. In normal operation, the computer will respond to the receipt of each "make" code, such as by repeating the associated character displaying on the computer display.

The wired keyboard as described above, has proven to be very reliable and perform very well. However, as the computer industry is a very competitive and rapidly changing industry, computer manufacturers must continuously introduce new products to the market to ensure their competitiveness and profitability.

In the design and manufacture of new computer systems, particularly of the personal computer ("PC") type, there is great pressure by consumers to introduce unique new functions and features for the computer.

An example of a design effort to expand the functions of a personal computer is the PC/TV convergence device. The PC/TV convergence device is a computer system having video/television capability converged therein, so that one computer system may be used as a computer and as a television/video set.

Stated another way, the PC/TV convergence device is a fully functional computer which also emulates a television, providing TV viewing (via broadcast, cable, Digital Satellite, or other broadcast media) and personal computing functionality. This convergence of computer and television provides a user with combined access to both television program information and computer functionalities.

Typically, a PC/TV convergence device consists of a fully functional computer including fax/modems, CD-ROM/DVD players, and media storage devices such as hard drives and floppy drives. The computer is interfaced with a video monitor, often a big screen television, with the television's NTSC interlaced signal being converted to a scan VGA signal or the computer's scan VGA signal being converted to an NTSC interlaced signal. Because the PC/TV convergence device is controlled by the computer's operating system, the PC/TV convergence device can, among other things, display PC applications and TV programs on a single monitor. The convergence of the personal computer and the television into a single device also permits the utilization of the communications bandwidth, mass storage and graphics of the computer to deliver, store and display applications during a traditional television viewing environment. The PC/TV convergence device also changes a typical television experience from just a passive viewing device to a user interactive device.

Some of the existing PC/TV convergence devices utilize wireless infrared keyboards to provide the user of the PC/TV convergence device greater freedom of movement as compared to keyboards physically wired to the computer. Infrared keyboards operate in a manner similar to that of wired keyboards through the transmission of an infrared signal, but can only operate in the "line of sight" from the keyboard to the computer. When a key is pressed on an infrared keyboard, and infrared "make" signal is sent from the keyboard's transmitter and received by an infrared receiver associated with the computer. When the key is released, an infrared "break" signal is transmitted from the infrared keyboard to the computer.

One significant problem with the infrared keyboard occurs when codes sent from the keyboard are not received by the computer. This may occur, for example, when someone walks between the keyboard and the computer when a user is utilizing the keyboard. This often creates undesirable results performed by the computer. For example, after a key is depressed, and the "make" code is sent from the keyboard to the computer, when the key is released, if the computer does not receive the "break" code, the computer may respond as if the key is still depressed.

Accordingly, it is desirable to provide a computer system utilizing an infrared wireless keyboard that can recover from "break" codes transmitted by the keyboard and not received by the receiver.

SUMMARY OF THE INVENTION

The present invention overcomes the above identified problems as well as other shortcomings and deficiencies of existing technologies by providing an apparatus and associated method for a computer system that can recover "break" codes transmitted by an infrared wireless keyboard but not received by a receiver.

The present invention further provides a computer system including an apparatus and associated method for the recovery of "break" codes transmitted by the keyboard but not received by a receiver in the computer system. The keyboard is an infrared keyboard that transmits to the receiver in the computer system "make" codes when keys of the keyboard are depressed, and similarly transmits to the receiver "break" codes when the keys of the keyboard are released. Upon receipt of the "make" and "break" codes, the receiver keeps track of the status of each of the keys, i.e., depressed or released, by updating a database in response to receipt of each "make" and "break" code. At select time intervals, the keyboard will transmit to the receiver an "idle" code containing data corresponding to the status of each key. Upon receipt of the "idle" code, the receiver compares the data of "idle" code with the status of each key as indicated by the data base. The receiver then generates a "break" code for each of the keys that do not compare.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
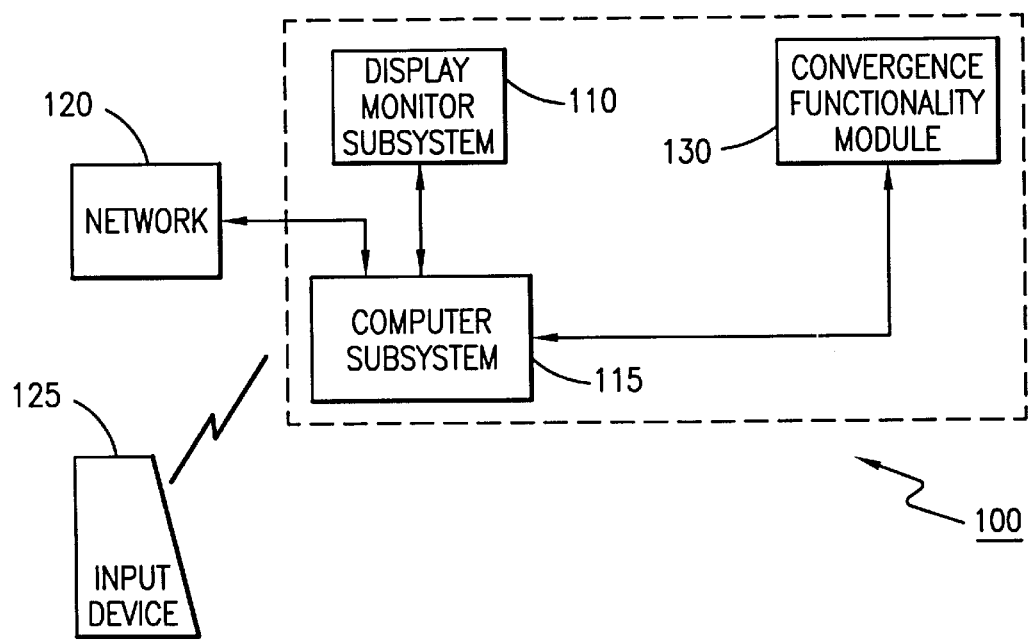
FIG. 1 is a block diagram illustrating an exemplary embodiment of a convergence device in accordance with the principles of the present invention.

Referring now to the drawings, and in particular, to FIG. 1, there is shown a block diagram of a convergence device system 100 utilizing the teachings of the present inventions. This block diagram illustrates features of the present invention and the basic principles of operation of an exemplary embodiment.

As illustrated in FIG. 1, the convergence device system 100 includes a display monitor subsystem 110, a computer subsystem 115, an input device 125 and a convergence functionality module 130. Display monitor subsystem 110 is operable to receive and display thereon display signals received from the computer subsystem 115. Computer subsystem 115 generally comprises a processor unit coupled to a storage unit, and a communication port for providing communication between the convergence device system 100 and network 120.

It contemplated that network 120 can be a network, such as a LAN (local area network), a WAN (wide area network), a telephone communication system, a metropolitan area network, or an intranet/internet network. The computer subsystem is connected to the convergence functionality module 130 that is adapted to receive and/or provide various combinations of composite RF, video, audio, graphics and/or data signals. For example, the module 130 may comprise a receiver for receiving TV signals in any form, such as National Television Standards Committee (NTSC) form or the Phase Alteration Line (PAL) form, via any medium, digital or analog, such as a cable system, digital satellite system, or a network broadcast medium.

In another embodiment, convergence functionality module 130 may comprise a consumer/home electronics unit adapted to be integrated with the computer subsystem 115. For example, a video gaming unit or a video disc unit may be provided such that the outputs (video, audio, or both) of the units are controlled or modulated by the computer subsystem 115. A video controller service in the subsystem 115 may be responsible for managing these outputs such that appropriately modulated (or decoded or processed) display signals are selected to be forwarded to drive suitable output devices, for example, the display monitor system 110 and/or audio output device (not specifically shown).

Although the module 130 and the subsystem 115 are shown to be two separate yet interconnected entities, the module 130 may, in some embodiments of the present invention, be integrated into subsystem 115. Such an integrated subsystem may comprise in a single housing one or more video sources (or consumer/home electronics units including receivers for TV signals, gaming units, video telephoning units, etc.), a video control device for managing and selecting among these sources and for generating appropriate display signals to be provided to suitable output devices, a processor, and data storage devices.

The convergence device system 100 may be operable with an input device 125. The input device may comprise any of the following: a remote control, a standard TV remote control, a remote track-ball/mouse device, a remote pointing device, a wireless keyboard, a wired keyboard, a keyboard integrated with a pointing device or a standard remote control device, et cetera. Furthermore, one of ordinary skill in the art would understand that convergence device systems 100 may contain hardware modules which include, but are not limited to, power supply module, TV tuner circuitry, video imaging circuitry, microphone/audio circuitry, CD-ROM devices, scanning devices, Facsimile devices, et cetera.

Figure 2:
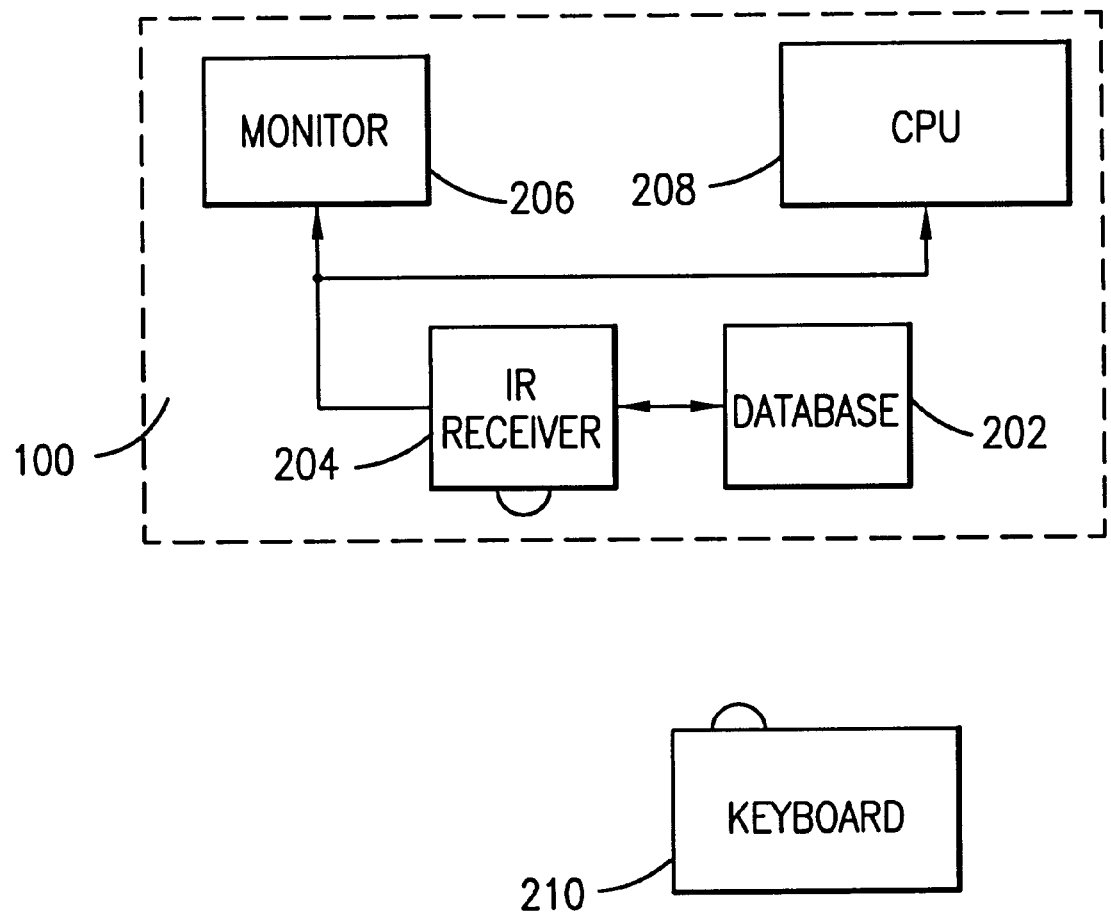
FIG. 2 is block diagram illustrating an second exemplary embodiment of a convergence device in accordance with the principles of the present invention.

Referring now to FIG. 2, there is illustrated a preferred embodiment of the present invention utilized in convergence system 100. As depicted convergence device system 100 includes a monitor 206, a central processing unit (CPU) 208, an infrared receiver 204 having associated therewith a database 202, and an infrared wireless keyboard 210.

Still referring to FIG. 2, wireless computer keyboard 210 generally operates in a fashion similar to a wired computer keyboard (a keyboard hardwired to the CPU) in that when a key is pressed on wireless computer keyboard 210, an infrared "make" signal is transmitted by keyboard 210 to CPU 208 via the infrared receiver 204, indicating that a particular key on the keyboard is being pressed. When the key is released, an infrared "break" signal is transmitted from the keyboard 210 to the CPU 208 (via the infrared receiver 204) indicating that the particular key has been released.

The CPU receives indications that codes have been received by the infrared receiver 204 and then controls the converged device or peripheral device according to the type of code received.

Still referring to FIG. 2, infrared keyboard 210, receiver 204 and data base 202 of convergence device system 100 operate to recover lost "break" codes transmitted from keyboard 210. As described above, when a "break" code is lost, the computer assumes the corresponding key on the keyboard is still being held down. The present invention overcomes this problem by having the keyboard 210 send an "idle" code to the infrared receiver 204 after a select period of time such as when there has been no new user input on the keyboard for a period of time. The "idle" code tells the current status of each of the keys. The infrared receiver 204 and database 202 keep a running status for each key of keyboard 210 and continuously update the database in response to the receipt of a "make" or "break" code. When an "idle" code transmitted by the keyboard 210 is received by the infrared receiver 204, infrared receiver 204 utilizes a microprocessor to compare the status of each key based upon the information of the "idle" code with the status of each key stored in database 202. If the "idle" code indicates that a key is not depressed and the status of the same key stored in database 202 is "depressed", this would indicate that a "break" code was lost. The infrared receiver 204 would then automatically generate the lost "break" code. The database would then be reset by infrared receiver 204.

Figure 3:
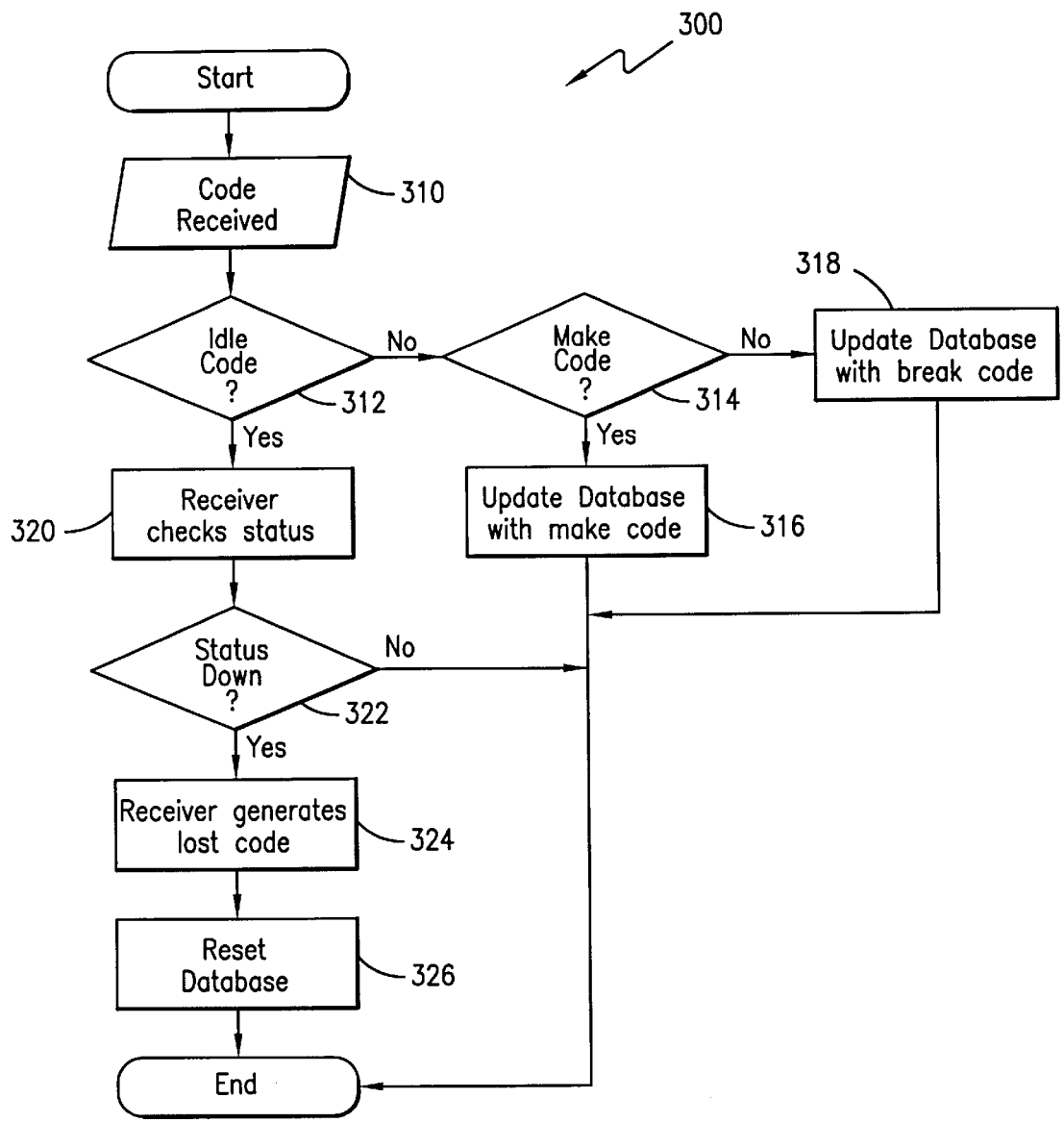
FIG. 3 is a block flow diagram illustrating an a method of recovering a lost "break" code in accordance with the principles of the present invention.

Referring now to FIG. 3, there is illustrated a flow diagram 300 of the operation of the present invention. As depicted by block 310, a code transmitted by keyboard 210 is received by infrared receiver 204. Then, as indicated by block 312, a determination is made as to whether the code received by infrared receiver 204 is an "idle" code. If the determination is made that the code is not an "idle" code, the 'no' path is followed to block 314.

As indicated by block 314, a determination is then made as to whether the code received by infrared receiver is a "make" code. If the determination is in the positive, the 'yes' path is followed to block 316, there the database 202 is updated with the status of the key corresponding to the "make" code, i.e., the status of the key is depressed. If the determination of block 314 is in the negative, the 'no' path is followed to block 318, whereupon the database 202 is updated with the status of the key corresponding to the "break" code, i.e., the status of the key is released.

Referring now back to block 312, if the determination was made that the code received by infrared receiver 204 was an "idle" code, the 'yes' path is followed to block 320. As indicated by block 320, infrared receiver 204 will compare the status of the keys from the information of the "idle" code with the data stored in database 202. Subsequent to the status check, as indicated by block 322, a determination is made whether the status of any of the keys as indicated by the "idle" code as being not "depressed" is in conflict with the status of the same key as indicated by the data of database 202 as being "depressed". If the determination is in the negative, i.e., the status of all of the keys as indicated by the "idle" code matches the status of all of the keys as indicated by the data from database 202, the 'no' path is followed and the procedure ends.

If the determination is in the positive, i.e., the status of at least one of the keys as indicated by the "idle" code does not match the status of at least one of the keys as indicated by the data from the database 202, the 'yes' path is followed to block 324. This indicates that a "break" code has been lost.

As indicated by block 324, because a "break" code has been lost, the receiver will generate the lost "break" code. Subsequent to block 324, infrared receiver 204 will then reset the database 202, such that the status of the keys stored therein match the status of the keys on the keyboard 210.

Although good results have been achieved in utilizing the present invention in a PC/TV convergence computer system with a wireless infrared keyboard, it is contemplated to be within the scope of this invention that the present invention could be implemented in any type of computer system utilizing wireless keyboards, such as, but not limited to RF keyboards.

Therefore, as can be appreciated, the present invention provides an apparatus and method for recovering "break" codes transmitted by a keyboard that are not properly received by the receiver of the computer system. The keyboard is an infrared keyboard that transmits to a receiver in the computer system "make" codes when the keys are depressed and transmits to the receiver "break" codes when the keys are released. Upon receipt of the "make" and "break" codes, the receiver keeps track of the status of each of the keys, i.e., depressed or released, by updating a database in response to receipt of the "make" and "break" codes. At select time intervals, the keyboard transmits to the receiver an "idle" code containing data corresponding to the status of each key. Upon receipt of the "idle" code, the receiver compares the "idle" code with the status of each key as indicated by the data base. The receiver then generates a "break" code for each of the keys that do not compare.

Although a preferred embodiment of the apparatus and associated method of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer convergence system comprising:
   a receiver;
   a keyboard including a plurality of keys, said keyboard operable to transmit a plurality of codes to said receiver, with a first of said codes corresponding to the depression of at least one of said keys, and a second of said codes corresponding to the release of said at least one of said keys; and a third code including data corresponding to the status of each of said plurality of keys of said keyboard, said third code being transmitted to said receiver at selected times; and
   a database in communication with said receiver, said database for storing data corresponding to the status of said plurality of keys in response to said receiver receiving at least one of said first code and said second code; wherein the receiver compares said data corresponding to the status of each of said plurality of keys of said third code with said data corresponding to the status of said plurality of keys stored in said database to update said database.

2. The computer convergence system as recited in claim 1, wherein said receiver includes an infrared receiver.

3. The computer convergence system as recited in claim 1, wherein said keyboard is a wireless infrared keyboard.

4. The computer convergence system as recited in claim 1, wherein said receiver generates said second code for at least one of said plurality of keys if the determination is made that said data corresponding to the status of at least one of said plurality of keys of said third code differs from said data corresponding to the status of the corresponding key stored in said database.

5. A computer system comprising:
   a receiver;
   a wireless keyboard including a plurality of keys, said keyboard operable to transmit a plurality of codes to said receiver;
   said plurality of codes including a make code corresponding to the depression of at least one of said keys, a break code corresponding to the release of said one of said keys, and an idle code, said idle code including data corresponding to the status of each of said plurality of keys of said keyboard said idle code being transmitted to said receiver at selected times; and
   a database in communication with said receiver, said database for storing data corresponding to the status of said plurality of keys in response to said receiver receiving at least one of said make code and said break code and said database updated in response to the reception of said idle code.

6. The computer system as recited in claim 5, wherein said receiver includes an infrared receiver.

7. The computer system as recited in claim 5, wherein said receiver generates said break code for at least one of said plurality of keys subsequent to the determination that said data corresponding to the status of at least one of said plurality of keys of said idle code differs from said data corresponding to the status of the corresponding key stored in said database.

8. In a computer system having a wireless keyboard that transmits to a receiver a make code when a key is depressed and a break code when a key is released, a method of recovering a break code transmitted from the wireless keyboard but not received by the receiver, said method comprising the steps of:
   maintaining the status of each key in a database associated with a receiver in response to the receiver receiving the make code and the break code;
   transmitting from the wireless keyboard to the receiver an idle code, the transmission of the idle code occurring in response to the keyboard being inactive for a select period of time, the idle code including data corresponding to the status of each key of the keyboard;

comparing the status of each of the keys as indicated by the idle code with the status of each of the keys as indicated by the database; and generating a break code by the receiver for each of the keys that the status of the keys as indicated by the idle code did not match with the status of the keys as indicated by the database.

9. The method as recited in claim 8, and further comprising the step of resetting the database subsequent to said step of generating a break code by the receiver.

* * * * *